Figure 1:
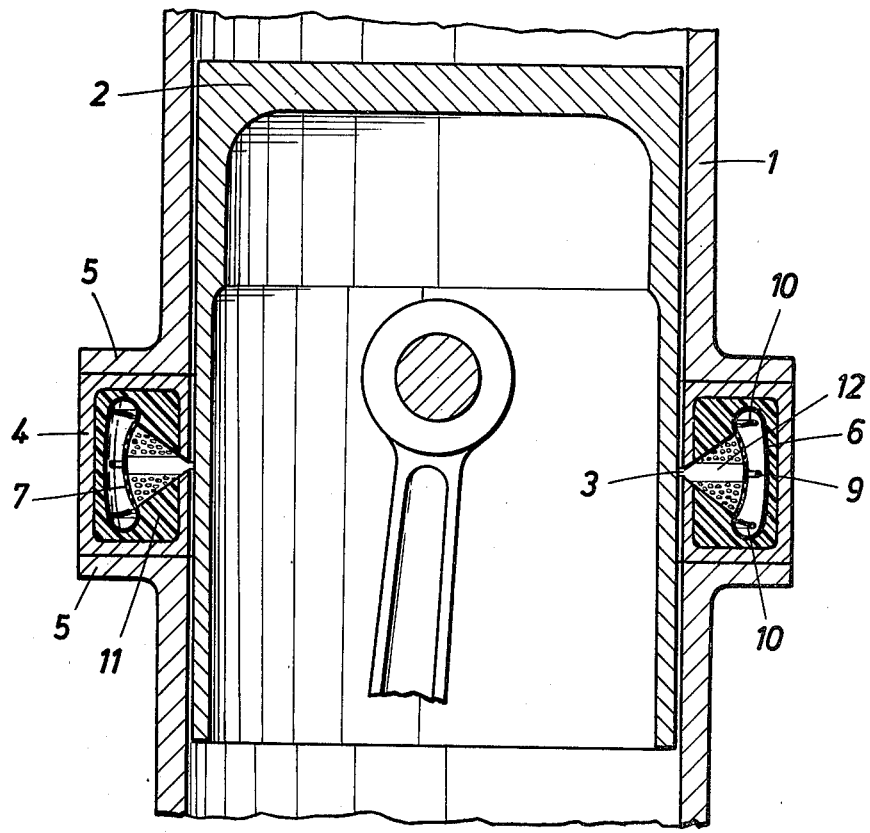

United States Patent [19]

Fimml

[11] 4,135,437

[45] Jan. 23, 1979

[54] PISTON MACHINE HAVING A NON-CONTACTING SEAL

[76] Inventor: Hans Fimml, Klausenerstrasse 4, Innsbruck, Austria

[21] Appl. No.: 831,234

[22] Filed: Sep. 7, 1977

[30] Foreign Application Priority Data

Sep. 14, 1976 [AT] Austria ................................ 6786/76

[51] Int. Cl.² ............................................. F16J 15/16
[52] U.S. Cl. ...................................... 92/168; 92/169; 92/172; 277/22; 277/80; 277/237 R
[58] Field of Search ................... 277/1, 232 R, 80, 22; 92/162 R, 168, 172

[56] References Cited

U.S. PATENT DOCUMENTS

| | | | |
|---|---|---|---|
| 3,110,294 | 11/1963 | Nymon | 123/119 E |
| 3,921,985 | 11/1975 | Fimml | 277/22 |

FOREIGN PATENT DOCUMENTS 1956759  5/1971  Fed. Rep. of Germany ............ 277/80

*Primary Examiner*—Paul E. Maslousky
*Attorney, Agent, or Firm*—Kurt Kelman

[57] ABSTRACT

A piston machine has a piston movable in a cylinder. The piston has a peripheral surface defining a clearance space with the inside cylinder surface. An annular slot in one of the surfaces is surrounded by, and communicates with, an annular chamber forming part of the one surface and an annular hollow conductor in the chamber has an apertured wall portion facing the slot. An anode and at least one cathode contained in the conductor are operable to cause electrons to be emitted from the cathode and to become trapped by gas molecules contained in the conductor so that the gas molecules are converted into gas ions, to cause the gas ions to move through the apertured wall portion and the slot into the clearance space, and to cause electric fields to confine the gas ions in the clearance space to form a gas ion barrier which seals the clearance space.

6 Claims, 3 Drawing Figures

PISTON MACHINE HAVING A NON-CONTACTING SEAL

This invention relates to a piston machine comprising a non-contacting seal between the piston and cylinder surfaces, in which voltages having the same polarity are applied to the piston and cylinder surfaces and the seal consists of gas ions which are formed by gas molecules which have trapped emitted electrons and are confined in at least one annular peripheral area by electric fields.

The applicant has already proposed in U.S. Pat. No. 3,921,985 to replace the piston rings usually employed as seals in piston machines by an arrangement in which a negative voltage is applied to the piston and cylinder surfaces so that the electric fields exert suitable forces on the piston to guide the same. When the piston clearance amounts only to a few hundredths of a millimeter, the voltage which is required is relatively low. The forces which act on the piston as a result of the electric repulsion balance each other when the piston is centered but even slight departures of the piston from a central position, of an order of 0.005 millimeter, will give rise to restoring forces which are sufficiently strong to prevent a contact of the piston with the cylinder wall. The clearance space between the piston and cylinder surfaces is sealed by a gas ion barrier, which is formed because the piston has an annular peripheral portion which is provided with a surface layer that emits electrons at a sufficiently elevated temperature. These emitted electrons are trapped by gas molecules, which are thus ionized, and the resulting gas ions are confined in said peripheral area by suitable electric fields established between the cylinder and piston. That arrangement has the disadvantage that a relatively high temperature is required for the desired emission of electrons and that the required concentration of gas ions cannot easily be maintained because the field intensities required for that purpose cannot be obtained without special measures.

It is an object of the invention so to improve a piston machine of the kind described first hereinbefore, which has a non-contacting seal between piston and cylinder surfaces, that a highly concentrated, closely confined gas seal can be produced and maintained in the clearance space between the piston and cylinder with simple means.

In accordance with the invention that object is accomplished in that the cylinder surface or piston surface is formed adjacent to the seal with an annular peripheral slot, which leads to an annular chamber, in which an annular peripheral hollow conductor is disposed, which contains at least one cathode and at least one anode, and that that wall portion of the hollow conductor which faces the clearance space to be sealed has a concave curvature toward the peripheral slot and is formed with apertures.

These measures ensure a sufficient ionization of gas molecules because electrons can easily be produced by the field emission from a cathode and a concentrated and closely confined gas ion seal is produced. Because that wall portion of the hollow conductor which faces the clearance space to be sealed is formed with apertures, the electrostatic charge which is produced in the hollow conductor as a result of the emission of electrons causes an internal electric field to be established, which is directed toward the apertures and propels the emitted electrons and/or the ionized gas molecules out of the hollow conductor toward the peripheral slot. As the apertured wall of the hollow conductor has a concave curvature toward the peripheral slot, the external electric field, which is directed toward the peripheral slot, is concentrated toward the slot so that the gas ions formed by the gas molecules which have trapped electrons are propelled toward the peripheral slot. Since strong electric fields are produced at the edges of the peripheral slot owing to the point effect, the gas ions which are propelled through the peripheral slot into the clearance space are held in a closely confined peripheral area thereof so that the desired gas ion seal is formed in the clearance space between the piston and cylinder.

To ensure a suitable focussing of the field which propels the gas ions through the peripheral slot into the clearance space, that wall portion of the hollow conductor which faces the clearance space to be sealed has preferably a curvature which is concentric to the peripheral slot.

The directed transfer of gas ions can be further promoted in that the annular chamber is lined with insulation which leaves free an annular space which in cross-section tapers in wedge shape from the apertured wall portion of the hollow conductor to the peripheral slot. In that case the negative charges applied to the insulation subject the remaining stream of gas ions to repelling forces which promote the concentration of gas ions adjacent to the slot.

Figure 2:
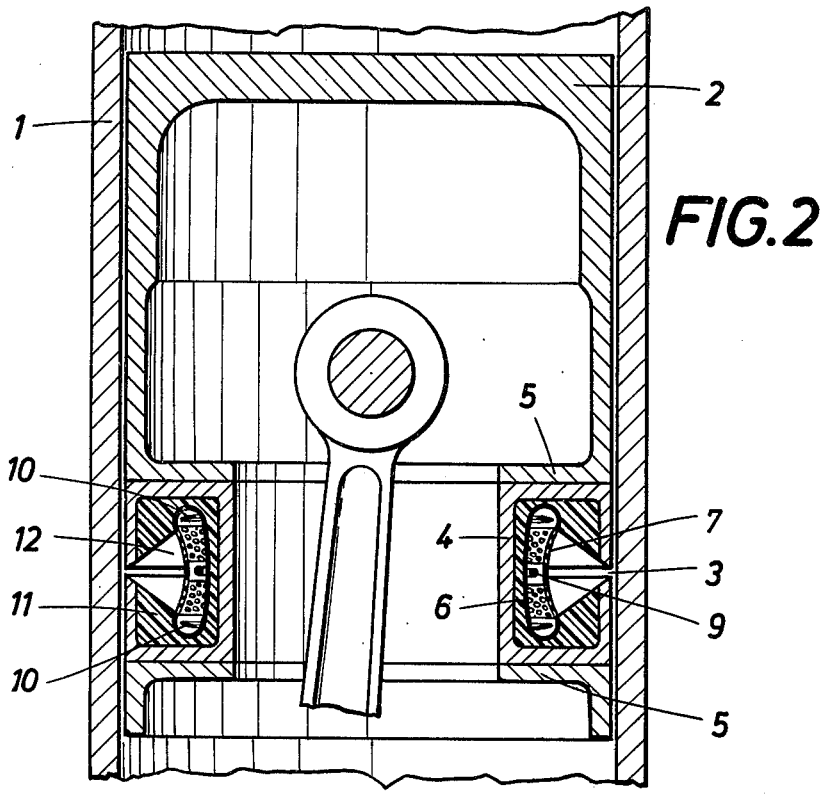
Figure 3:
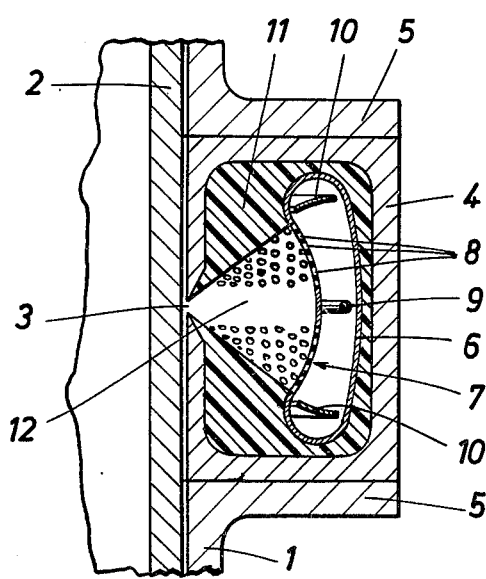

An embodiment of the invention is shown by way of example on the accompanying drawings, in which FIG. 1 is a sectional view showing the cylinder of a piston machine according to the invention, in which a non-contacting seal is provided and the peripheral slot is formed in the cylinder wall, FIG. 2 is a view which is similar to FIG. 1 and shows a piston machine which has a non-contacting seal and the peripheral slot is provided in the piston wall, and FIG. 3 is an enlarged sectional view showing the annular chamber.

As is clearly apparent from FIGS. 1 and 2, the gas ion seal may be installed in the cylinder 1 or in the piston 2 of the piston machine. Because electric leads can be more easily connected to the cylinder than to the piston, the seal will usually be provided in the cylinder, as is shown in FIG. 1.

For this purpose the wall of the cylinder 1 is formed with an annular peripheral slot 3, which leads to an annular chamber, which is defined by a chamber structure 4. The latter is held between two ring flanges 5 and connected by the latter to other parts of the cylinder.

The annular chamber defined by the structure 4 contains an annular peripheral hollow conductor 6, which is formed with apertures 8 in its wall portion 7 facing the peripheral slot 3. That wall portion 7 of the hollow conductor which is formed with apertures 8 has a curvature which is concentric to the peripheral slot 3, as is clearly apparent from FIG. 3.

The hollow conductor 6 contains an annular peripheral anode 9 and two cathodes 10, which are symmetric to said anode. For the sake of clearness, the connection of the anode 9 and of the cathodes 10 to leads at suitable voltages is not shown. This connection is effected in conventional manner.

In the embodiment shown by way of example, the hollow conductor 6 is partly embedded in insulation 11, with which the chamber structure 4 is lined and which defines an annular space 12, which is wedge-shaped in cross-section and tapers from the wall portion 7 of the hollow conductor to the peripheral slot 3.

When a voltage is applied between the cathodes 10 and the anode 9, a stream of electrons will flow from each cathode to the anode and will partly impinge on the wall of the hollow conductor 6 to maintain electrostatic charges therein. Owing to those electrostatic charges, an external electric field is established around the hollow conductor 6. Only that portion of that field is interesting which is directed toward the peripheral slot 3. Because the wall portion 7 of the hollow conductor is concave on the side facing the peripheral slot 3 and in the embodiment shown by way of example is concentric thereto, the external field is focussed adjacent to the peripheral slot 3. The apertures 8 in the wall portion 7 of the hollow conductor cause an electric field to be established in the hollow conductor 6. That field is directed toward the apertures 8 and is superimposed on the cathode-anode field so that a large part of the emitted electrons are propelled into the wedge-shaped annular space 12. Those charged particles which do not travel through the apertures 8 but impinge on the wall of the hollow conductor maintain the electrostatic charge of the hollow conductor. The intermediate region 13 of the wall portion 7 of the hollow conductor has no apertures so that the anode 9 is electrostatically shielded.

The gas ions formed by gas molecules which have trapped electrons emitted by the cathodes are propelled by the electric field in the annular space 12 toward the peripheral slot 3. The gas ions are held at a closely confined peripheral area of the charged piston wall by the electric point fields established at the extremities of the edges at which the also charged cylinder defines the peripheral slot 3 and by the electric field which is established in the annular space 12 and condensed toward the peripheral slot 3. The resulting gas ion barrier has a cross-sectional area which has approximately the configuration of a square having a side length equal to one-half of the piston clearance. The stability of that gas ion barrier depends on the width of the clearance space between the piston and cylinder because the field intensities required in view of the high gas pressures will be available in about one-half of the width of the clearance space. The conditions are such that the largest eccentricity of the piston and the largest clearance between the piston and cylinder walls on one side will not occur before the piston has performed one-half of its stroke so that the gas forces have decreased to about one-half of their peak value. Besides, the increase of the width of the clearance space remains within very small limits so that the load on the gas ion barrier remains approximately constant between the upper dead center position and the middle position of the piston. The conditions in the lower one-half part of the stroke are of no interest.

The voltages produced by the above-described charging operations must not reach excessively high values. This can be ensured in a simple manner by the selection of suitable dimensions for the insulation or by special leakage paths which have properly selected resistances. Whereas the piston 2 must be charged like the cylinder 1, a separate electric lead may not be required because sufficient charges may be transferred to the piston wall from the gas ion barrier.

The intensity of the electric fields established around the points which are constituted by the cylinder edges defining the slot 3 in the cylinder must also be selected in consideration of the peak gas pressures. To permit of a control of these fields established around the points, the chamber structure 4 may be electrically insulated from the remaining parts of the cylinder.

The cathodes 10 are tunnel cathodes, e.g., $Al-Al_2O_3$-Au cathodes, which require a supply voltage of about 5 to 10 volts.

FIG. 2 shows an arrangement which is similar to that of FIGS. 1 and 3 and in which the chamber structure 4 is accommodated in the piston 2. The conditions with respect to the gas ion barrier are the same. Only the application of the supply voltages involves a higher expenditure because the annular chamber is accommodated in the moving piston.

What is claimed is:

1. A piston machine comprising
a cylinder having a cylinder wall, which has an inside peripheral surface,
a piston which is movable in said cylinder and has a piston wall, which has an outside peripheral surface which defines a clearance space with said inside peripheral surface,
an annular peripheral slot formed in one of said walls adjacent to the other,
a chamber structure which forms part of said one wall and defines an annular peripheral chamber, which surrounds said slot and communicates therewith,
an annular peripheral hollow conductor, which is contained in said chamber and has an apertured wall portion which faces said slot and is concave toward the same, and
means for maintaining electrostatic charges having the same polarity on said inside and outside peripheral surfaces and for emitting electrons, which means comprise an anode and at least one cathode contained in said hollow conductor and are operable to cause electrons to be emitted from said cathode and to become trapped by gas molecules contained in said hollow conductor so that said gas molecules are converted into gas ions, to cause said gas ions to move through said apertured wall portion and said slot into said clearance space, and to cause electric fields to be established in said clearance space adjacent to said slots on opposite sides thereof so that said electric fields confine said gas ions in said clearance space adjacent to said slot to form a gas ion barrier which seals said clearance space.

2. A piston machine as set forth in claim 1, in which said means are operable to produce gas ions in said hollow conductor which impinge on said wall portion to maintain an electrostatic charge in said hollow conductor.

3. A piston machine as set forth in claim 1, in which said one wall is said cylinder wall and said other wall is said piston wall.

4. A piston machine as set forth in claim 3, in which said means are operable to cause electric charges having the same polarity as said charges on said inside peripheral surface to be transferred from said gas ion barrier to said outside peripheral surface.

5. A piston machine as set forth in claim 1, in which said wall portion is concentric to said slot.

6. A piston machine as set forth in claim 1, in which said chamber structure comprises an insulating liner, which defines in said chamber an annular space which is wedge-shaped in cross-section and tapers from said wall portion to said slot.

* * * * *